July 14, 1942. C. F. WALLACE 2,289,610
CELL AND SYSTEM FOR USE IN THE CONTROL OF COMPOSITIONS OF FLUIDS
Filed March 23, 1939 2 Sheets-Sheet 1
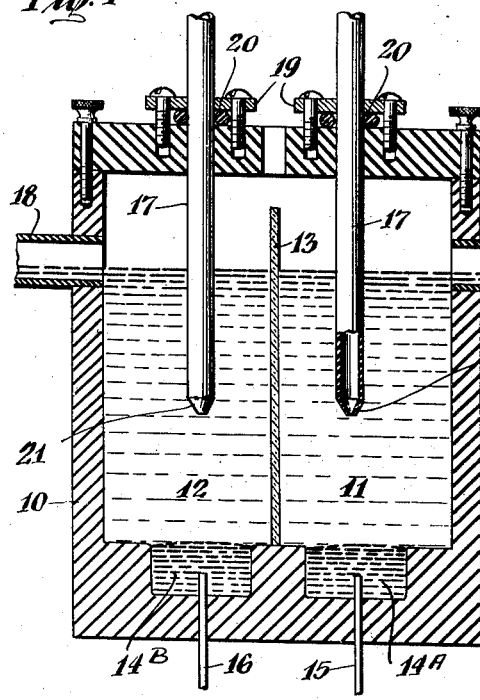
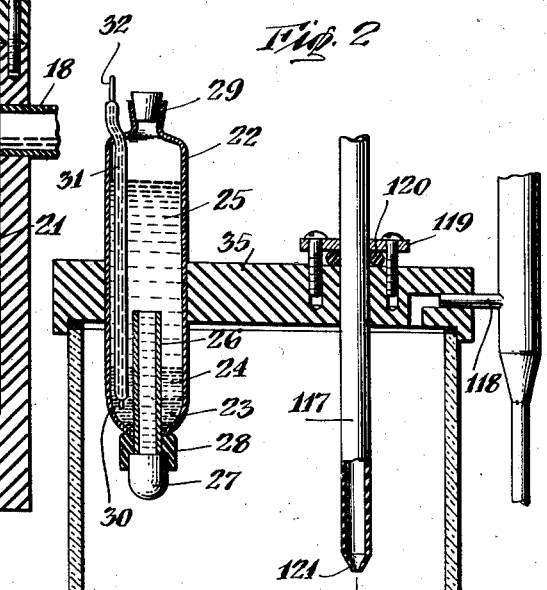
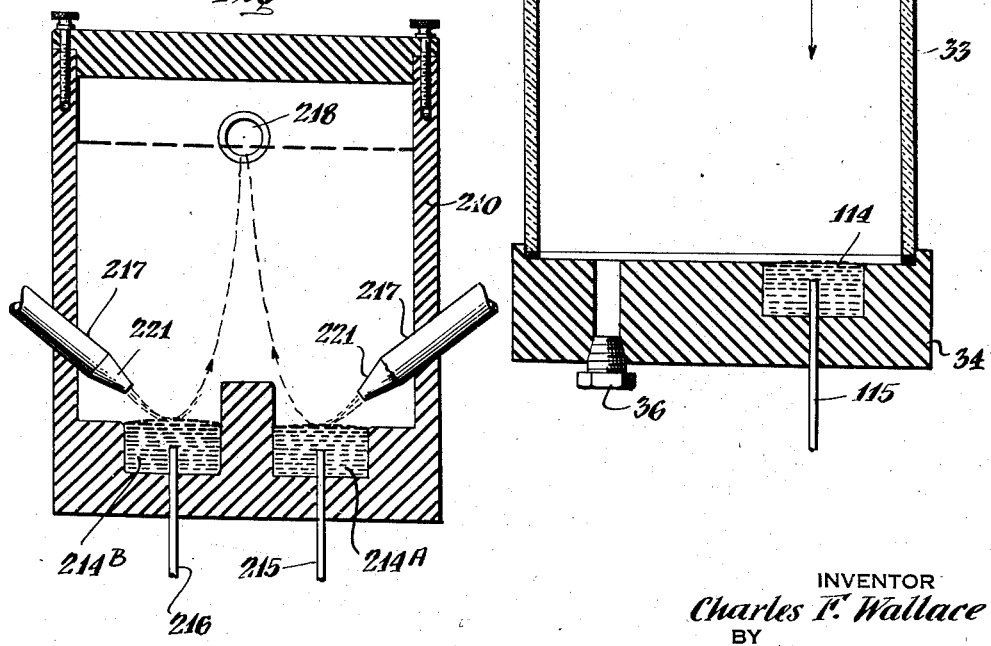
INVENTOR
Charles F. Wallace
BY
Cooper, Kerr & Dunham
ATTORNEYS July 14, 1942.  C. F. WALLACE  2,289,610
CELL AND SYSTEM FOR USE IN THE CONTROL OF COMPOSITIONS OF FLUIDS
Filed March 23, 1939  2 Sheets-Sheet 2
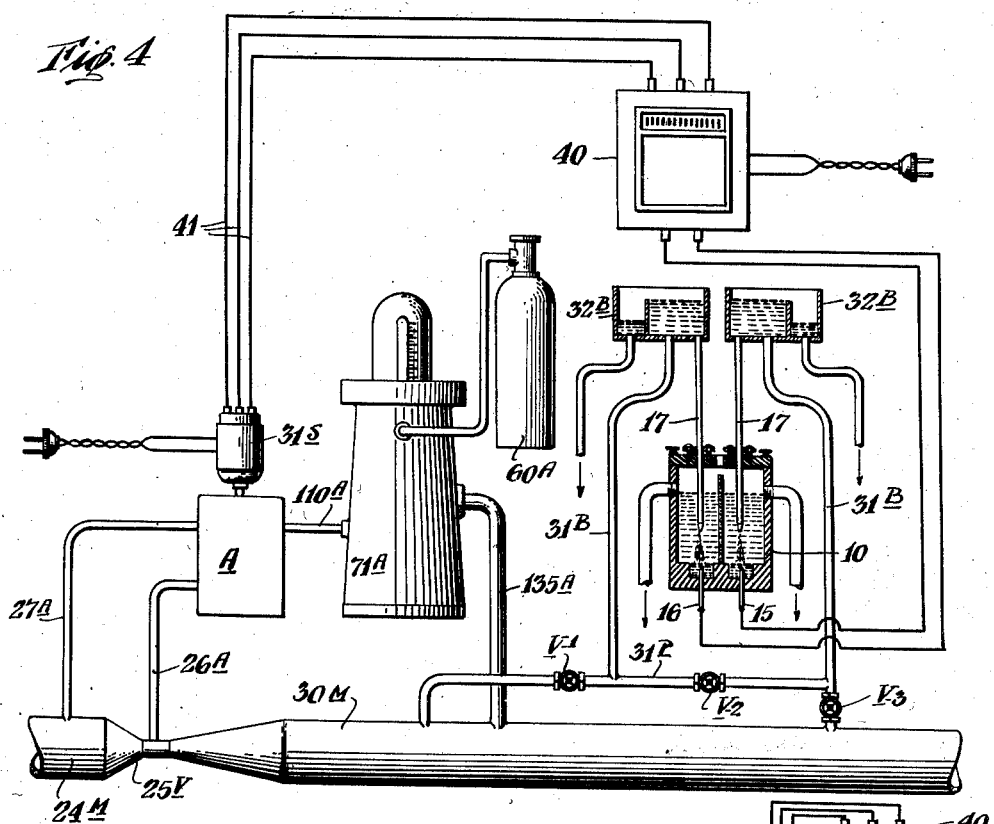
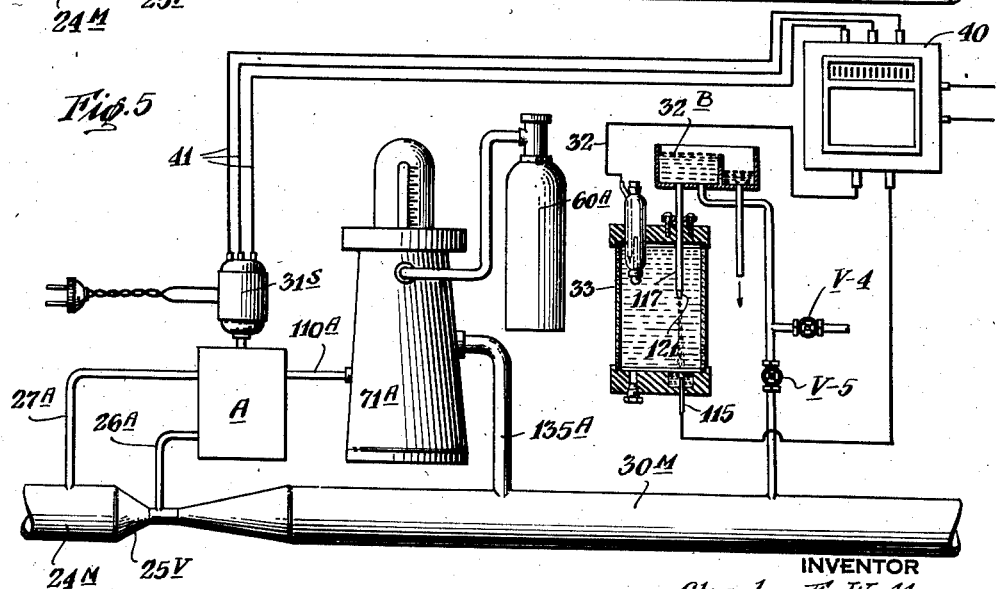
INVENTOR
Charles F. Wallace
BY
Cooper, Kerr & Dunham
his ATTORNEYS Patented July 14, 1942

2,289,610

UNITED STATES PATENT OFFICE 2,289,610

CELL AND SYSTEM FOR USE IN THE CONTROL OF COMPOSITIONS OF FLUIDS

Charles F. Wallace, Westfield, N. J., assignor to Wallace & Tiernan Products, Inc., Belleville, N. J., a corporation of New Jersey Application March 23, 1939, Serial No. 263,660

12 Claims. (Cl. 210—28)

This invention relates to cells and systems for detecting changes in composition of a liquid.

One of the objects of the invention is to provide novel cells which are more sensitive in their operation.

Another object is to provide novel cells which are more reliable in their operation.

A further object is to provide improved systems for detecting and indicating changes in composition of a liquid.

A still further object is to provide improved systems for detecting changes in composition of a liquid and in automatically controlling the composition of the liquid.

Still further objects will become apparent to those skilled in the art after reading the following disclosure of the invention.

Referring to the drawings which illustrate what I now consider to be a preferred form of the invention and some of the variants and modifications thereof:

Fig. 1 is a partially diagrammatic sectional elevation showing one form of cell constituting a part of my improved system.

Fig. 2 is a similar view but illustrating a modification.

Fig. 3 is a similar view but illustrating another modification.

Fig. 4 is a somewhat diagrammatic view showing a complete system embodying the cell shown in Fig. 1.

Fig. 5 is a somewhat diagrammatic view showing a complete system embodying the cell shown in Fig. 2.

While my invention is capable of other uses and of use in other environments, it is especially suitable for use in connection with the treatment of water, such as drinking water, sewage, etc., by chlorination. I have therefore shown, and shall hereinafter describe, applications of the invention to such systems.

In Letters Patent of the United States No. 1,944,803, patented January 23, 1934, on application filed by Georg Ornstein, there are disclosed systems in which a metallic electrode is subjected to untreated liquid, another metallic electrode is subjected to the liquid after treatment, and in which the voltage developed across these electrodes is employed to indicate, temporarily or permanently, a change in the compositions of the treated liquid, or to control apparatus for correcting a change in composition of the treated liquid, or both. In Letters Patent of the United States No. 2,076,964, patented April 13, 1937, on application filed by Richard Pomeroy, there is disclosed a system generally similar to that of the cited Ornstein patent but differing therefrom in that, inter alia, Pomeroy discloses a single electrode subjected to the treated liquid in combination with a reference or comparison standard half cell. In the arrangements disclosed by these cited patents the electrode or electrodes which are subjected to the treated or untreated liquid, which in some cases may be sewage, become dirty, slimy, inactivated and otherwise chemically reacted upon, thereby causing their sensitivity and operation to vary. It is difficult to calibrate them and to maintain desired accuracy of indication or control without repeated inspection, supervision, and attention. My invention overcomes the foregoing objections and shortcomings.

According to my invention, I employ a cell comprising one or more liquid electrodes. Preferably, I employ one or more fluid metallic electrodes consisting of mercury or other liquid metals, such as, for example, silver, or other suitable metals, amalgamated with mercury in such proportion that the amalgam or composition is fluid. The electrode contact surfaces are kept clean, fresh and sensitive by one or another of means such as are hereinafter described or referred to.

In Fig. 1 I have shown a cell which may be employed in a system such as that shown in Fig. 2 of the cited Ornstein patent. The casing or chamber 10 of this cell, of hard rubber or other liquid-tight insulating material, is divided into two compartments 11, 12, by a porous diaphragm or partition 13. Each of these compartments contains an electrode, 14A, 14B, consisting of fluid metal such as described immediately above, say mercury; suitable pockets being formed in the bottom of the compartments to receive and contain the electrode material. Each of the pools of mercury 14A, 14B is in electrical contact with a corresponding one of two conductors 15 and 16, which may be made of platinum wire. Each of the cell compartments is provided with a vertical pipe or conduit 17, which may be made of glass or hard rubber, and which terminates in a nozzle or jet 21. For a purpose presently appearing, each of the pipes 17, 17 is shown vertically adjustable in the casing 10 and each may be locked in any desired position of adjustment by means such as the gaskets 20 and clamping rings 19. Overflow openings 18 are provided in each of the compartments 11, 12.

When employed in systems such as disclosed in the cited Ornstein patent, the untreated liquid is supplied to one of the compartments 11, 12 through its pipe 17, and the treated liquid is supplied to the other compartment through its pipe 17; the overflow from each compartment taking place through its corresponding orifice or outlet 18. The conductors 15, 16 are connected to the indicating, recording, metering, or control circuit.

The stream of untreated liquid which enters the compartment 12, through its pipe 17 and jet 21, drives straight down without much spreading until it strikes the surface of the underlying mercury pool 14B, thereby agitating the mercury. After it impinges upon the mercury the untreated liquid flows upwardly around the jet and out of the overflow 18 of the compartment 12. The operation of the electrode in the other compartment, 11, is similar except that treated, instead of untreated, liquid enters through the pipe 17 of that compartment.

Before being placed in operation the two jets 21 are so adjusted that zero potential is obtained across conductors 15—16. This adjustment is effected by first supplying untreated liquid to both compartments 11, 12 through their pipes 17, or by supplying treated liquid to both compartments 11, 12. After this preliminary adjustment or calibration, the cell is placed in operation by supplying untreated liquid to the compartment 12, and treated liquid to the compartment 11, as described above.

A satisfactory embodiment of the cell shown in Fig. 1 is constructed so as to have a jet orifice or nozzle opening of about .1″ diameter, with the jets or nozzles 21 located about 1⅝″ above the surface of the underlying mercury surface, and using pools of mercury about 1½″ in diameter; the pressure of the liquid entering the pipes 17 may be that commonly employed in city water mains, or from a constant pressure apparatus such as the constant level box 32—b of Fig. 4, hereinafter described. In operation each jet of liquid impinges upon the underlying mercury surface so that the central superficial portion of the mercury lying directly under the jet and approximately ½″ in diameter, is depressed due to the velocity of the impinging jet. The remaining annular area of the contact surface of the mercury is continually filled with more or less concentric ripples which shift in position.

To obtain maximum scouring action on the mercury surface, the jet agitation may approach the condition in which the mercury surface would be broken by the impinging jet. Minor fluctuations take place in the mercury surface directly under the jet. With this optimum arrangement and adjustment, the surface of the mercury remains unbroken in spite of the agitation thereof.

In operation, assuming that the liquid is water and that it is being treated say with chlorine, the presence of untreated water in the compartment 12, and chlorinated water in the compartment 11, causes a difference in potential to exist between the pools 14A and 14B to which the conductors 15 and 16 are electrically connected. This difference in potential may be correlated with the chlorine concentration of the compartment 11. If the composition of the treated liquid changes, i. e., if the concentration of the chlorine in the treated water changes, the difference of potential at 15—16 correspondingly changes. Up to a certain point, voltage read across the conductors 15—16 is substantially proportional to the unconsumed or residual chlorine in the water under treatment. In practical cell operation, this proportionality ceases between .2 and .75 P. P. M. chlorine in water depending on jet size and position. The voltage continues to increase above this point with increasing chlorine concentration but the device gradually becomes more insensitive to small changes at these high residuals.

Cells embodying my invention respond quickly to changes in the composition of the liquid, specifically, in the case now under consideration, they respond quickly to changes in the chlorine concentration. When change in the concentration occurs, the changed liquid is brought immediately into contact with the mercury surface by the impinging action of the jet which conveys the treated liquid into the compartment 11. It is not necessary that the contents of either compartment 11, 12 be thoroughly or completely swept out before a change of composition (concentration) produces a change in voltage across the conductors 15—16, although a small period of time elapses before the voltage as read across 16—17 settles down to its full equilibrium value. With a given concentration of chlorine, small changes in the concentration of many substances in the raw or untreated water have no disturbing effect upon the voltage across the conductors 15—16. In the concentrations in which they are present in normal water works practice, small changes in alkali salts, carbonic acid, manganese, nitrites, iron, etc., have a negligible effect upon the voltage across the conductors 15—16. Substances such as ammonia have a more pronounced effect but the results obtained are consistent provided fluctuations in the ammonia content are neither too great or too rapid. Changes in the pH value have but slight effect on the voltage across the conductors 15—16 provided they are within the limits ordinarily encountered in water works practice.

If the jets are lowered so that the impact of the water breaks the surface of the underlying mercury erratic results are often obtained. While I believe that this may be due to frictional effects, I am not certain as to the exact cause. Readings taken under such conditions usually show relatively little sensitivity and poor reproducibility. As the jets are moved back (i. e. up) from this position, the sensitivity to chlorine increases and likewise the steadiness of the readings. In the particular cell described above, the maximum sensitivity is obtained when each jet is about 1½″ above its mercury surface, and above that point no increase is noted up to two inches or more. When the jets or nozzles are placed too far from the mercury surfaces the scouring effect is insufficient to keep the mercury surfaces clean and loss in efficiency results.

When the design and adjustment are proper, the scouring effect combined with the agitation of the mercury surfaces tends to keep the mercury surfaces free from the effects of polarization, which is an important advantage, particularly when the cell is used to supply current for indication or control purposes. The same features also tend to wash away any impurities which may form as a result of chemical action between the mercury, and the treated or untreated liquid. By changing the size of the nozzles or jets, the optimum height and size of the cell and the mercury change in proportion. The size of the jet is also related to the amount of water flowing through it and, generally, the more water the higher the jet should be for optimum operating conditions. In most practical apparatus, the amount of water is limited by the size of the jet and the rather small amount of pressure head which it is possible to have and at the same time maintain a constant flow. It is important that water flow be maintained constant within limits of 5% if the desired accuracy is to be obtained.

In Fig. 2 I have shown a cell which may be employed in a system such as that shown in the cited Pomeroy patent. Here there is no electrode in contact with the raw or untreated liquid but a reference electrode is used in conjunction with the mercury electrode; the latter being subjected to the treated liquid and connected to the reference electrode through a suitable means of ionic connection, such as a saturated potassium chloride salt bridge. The elements or parts 114, 115, 117, 121, 119, 120 are similar to the elements or parts 14A, 15, 17, 21, 19 and 20, respectively, described above in connection with Fig. 1. The casing of the cell is shown as comprising a transparent glass cylindrical portion 33, for facilitating inspection, and top and bottom caps or end pieces 35, 34 of hard rubber detachably clamped together by suitable means (not shown). Treated liquid is introduced through the pipe 117 and overflows at the opening 118. A removable plug 36 normally closes a drain opening in the bottom of the cell and facilitates cleaning of the cell when necessary.

The reference electrode is of conventional construction, preferably a calomel cell which I shall now proceed to describe. The glass tube 22 contains a pool of mercury 23 above which is a saturated solution of mercurous chloride 24, the remainder of the space containing a saturated solution of potassium chloride 25. A central glass tube 26 extends through the bottom of the tube 22. The upper end of the tube 26 opens into the potassium chloride solution above the level of the mercurous chloride, and the lower end of the tube 22 has a porous plug 27 tightly secured to it, as by means of a rubber sleeve 28. The potassium chloride solution is thus allowed to diffuse slowly into the chamber formed by the tube 33 and is washed out with the overflow. Potassium chloride is added from time to time, as needed, through the opening 29 at the upper end of the tube 22. A platinum wire 30, sealed in a glass tube 31, makes electrical contact at its lower end with the mercury 23 and is connected at its upper end, outside the tube 22, to the electrical conductor or wire 32.

In operation, this cell may be used with either water solutions of chemicals both strong and weak, sewage or other solutions of a similar nature. The readings obtained will be a voltage which represents the difference between that of the calomel reference cell and that generated at the surface between the mercury 114 and the liquid undergoing observation. This potential may be used as an indication of oxidation-reduction, may be correlated to the residual chlorine content of the treated liquid or indicate a combination of either of these two factors with pH. In particular, in applications where it is used on sewage, this cell has very definite advantages. Where sewage is strongly reducing and contains quantities of hydrogen sulphide and other organic reducing materials, most metallic electrodes are soon covered with a film of sulphide which poisons their action and detracts from their usefulness. Use of the noble metals reduces the difficulty from sulphide formation but does not prevent sliming up and polarization. The slime condition is particularly bad in sewage or industrial wastes. Due to the excellent jetting action in my invention which has been described above, even though sulphide film forms, on the surface of the mercury 114, it is immediately washed off and the central substantially ½" area directly under the jet, and which receives the full force of the jet, is at all times clean even though the outer part of the surface of the pool is covered by a black film of tarnish. When this tarnish accumulates too greatly, it is easy to remove it by running ordinary tap water through the cell, which in a short period of time, brings the entire surface of the mercury 114 to a state of complete brightness. Also treatment of the sewage or waste to eliminate its $H_2S$ content will result in a non-corroding sample and after a short period of time the cell will clear up just as it did when tap water was used. Since in general this cell will be used to control above the point of sulphide formation, the cell remains clean even though subjected to short periods of chemical attack.

The modification shown in Fig. 3 comprises the parts or elements 210, 214A, 214B, 215, 216, 217, 218, 221 which correspond generally to the parts 10, 14A, 14B, 15, 16, 17, 18 and 21, described above in connection with Fig. 1. No diaphragm is employed in this cell (Fig. 3). The jets or streams impinge upon the surfaces of the respective pools 214A, 214B, at an angle and then flow upwardly and pass out through the overflow 218. The pipes 217 may be made longitudinally adjustable, as by means of elements 19 and 20 as shown in Fig. 1 (not shown in Fig. 3), and the adjustment of the jets to give a zero reading to calibrate the cell may be accomplished as described above in connection with Fig. 1. Likewise the apparatus shown in Fig. 3 may be so designed, constructed and adjusted as to produce the desired agitation and scouring of the surfaces of the pools as described in connection with Fig. 1. In this cell shown in Fig. 3, indeed in all of the other cells disclosed herein, a fluid amalgam may be employed instead of pure mercury.

Other cells invented by me, and which may be employed as a part of certain of the systems hereinafter claimed, are disclosed in my copending application filed of even date herewith, entitled "Fluid electrodes," and wherein I have set forth in greater detail a number of advantages and new and improved results obtained with my new electrodes and cells.

While, as stated, the cells shown in Figs. 1 and 3 may be employed as a part of systems such as that shown in Fig. 2 of the cited Ornstein patent, I now prefer to employ them as a part of the system shown in Fig. 4 of this application, which I shall now proceed to describe.

Water to be treated is supplied through a water main 24M from a suitable source, such as a reservoir, not shown, whence it flows through a Venturi tube 25V to the delivery main 30M. Chlorine solution is supplied to the delivery main 30M through the pipe 135A from the vacuum chlorinator 71A which in turn obtains its supply of chlorine gas from the cylinder 60A. For details of the apparatus 24M, 25V, 26A, 27A, 60A, 71A, 135A, see United States Patent No. 1,777,987, patented October 7, 1930, for "Apparatus for treating water" on application filed by me on November 30, 1927, Serial No. 236,853. As set forth in the last cited patent, the apparatus there disclosed is provided with adjusting means (specifically an adjustable valve 140) for varying the ratio between the rate of supply of chlorine and the rate of flow of water to which the chlorine is supplied. According to the present invention, a suitably controlled reversible motor 31S may be employed to effect the adjustment just mentioned.

In order that proportionality be automatically maintained between the amount of water flowing in the main 30M and the amount of chlorine gas in solution applied to the main 30M through the pipe 135A, the differential converter A is connected across the high and low pressure pipes 27A and 26A of the venturi 25V so that a vacuum proportional to the square of the flow of water through the main 30M will be applied to the metering instrumentalities of the chlorinator 71A through the pipe 110A, and thereby cause the application of chlorine through the pipe 135A to be directly proportional to the flow of water in the main 30M. For details of the differential converter A and related parts, reference may be had to United States Patent No. 1,762,706, patented June 10, 1930, for "Apparatus for producing a proportionately varying negative pressure" on application filed by me on November 30, 1927, Serial No. 236,852.

The last cited patent (No. 1,762,706) discloses an arrangement in which an adjustable orifice 26 is provided. When embodied in the present invention, the adjustment of the said orifice is effected automatically by the motor 31S. As disclosed in the last cited patent, the said adjusting means varies the ratio between the rate of supply of chlorine and the rate of flow of water to which the chlorine is supplied.

If the differential converter A is to be operated from Pitot tubes (see 37 in Fig. 6 of Patent No. 1,762,706) instead of from the venturi 25V, the pressure differential applied to the differential converter A may be too small to permit the use of a motor driven adjustable orifice. In that event, the motor 31S may be utilized to vary the ratio between the rate of supply of chlorine and the rate of flow of water by adjusting the position of a fulcrum such as that shown at 17 in Fig. 6 of Patent No. 1,762,706, or, as stated above, to adjust a valve such as the valve 140 disclosed in the other cited patent—No. 1,777,987.

The pipes 17, 17 of the cell 10 (shown in greater detail in Fig. 1 and described above) are each supplied with water under a constant head from a corresponding one of the two constant level boxes 32B, 32B, each of which overflows to waste. Water is supplied from the main 30M to the boxes 32B, 32B, through the system of piping shown, including the pipes 31B, 31B, a pipe 31P with which the pipes 31B, 31B connect, and which is connected at one of its ends to the delivery main 30M on the upstream side of the pipe 135A and which is connected at its other end to the delivery main 30M on the downstream side of the pipe 135A. Valves V—1, V—2 and V—3 are provided in the pipes 31P and 31B. When the valves V—1 and V—3 are open and the valve V—2 is closed, as in normal operation, untreated water is supplied under pressure from the main 30M to one of the boxes 32B and thence to the left hand compartment of the cell 10, and treated (chlorinated) water is supplied under pressure from the main 30M to the other box 32B and thence to the right hand compartment of the cell 10. For calibrating the cell and system, as mentioned above, untreated water is supplied to both compartments of the cell 10, and this may be conveniently effected by opening the valves V—1 and V—2 and closing the valve V—3. After the calibration has been effected, the valves V—1 and V—3 are open and the valve V—2 is closed.

The leads or conductors 15, 16 of the cell 10 are connected to a suitable translating device which in turn so controls the motor 31S as to cause a greater ratio of chlorine to be supplied to the main 30M when the voltage across 15—16 is below a predetermined value, and to cause a lesser ratio of chlorine to be supplied to the main 30M when the voltage across 15—16 is above the predetermined value. In this manner, the residual chlorine content of the water undergoing treatment is automatically maintained substantially constant as desired. The translating device for effecting the desired control may be a conventional recording potentiometer 40 which is adapted to control the reversible motor 31S through leads or conductors 41. If the voltage across the cell leads 15—16 is in agreement with the setting, nothing occurs. If the voltage across 15—16 is too high (i. e. above the predetermined voltage), a control contact (not shown) in the recorder 40 is closed, thereby causing the motor 31S to run in such direction as to effect an adjustment, as above described, to decrease the ratio of chlorine, supplied through the pipe 135A, to the water to which it is supplied. Conversely, if the voltage across 15—16 is too low (i. e. below the predetermined voltage) the recorder 40 exercises reverse control on the motor 31S to cause the chlorine ratio to be increased. In this way, and by these means, the cell 10, etc., through its connected instrumentalities, acts as a trimmer on the automatic flow proportioning apparatus which controls the flow of chlorine in proportion to the volume of water passing the point of application.

While, as stated, the cell shown in Fig. 2 may be employed as a part of a system such as that shown in the cited Pomeroy patent, I now prefer to employ it as a part of the system shown in Fig. 5, wherein the differential converter A, with its connections 27A, 26A, to supply main 24M, venturi 25V, chlorinator 71A, and delivery main 30M, etc., will at once be recognized in view of the description of the corresponding parts in connection with Fig. 4. Likewise, the potentiometer recorder 40, connections 41 and reversible motor 31S will also be recognized. The cell of Figs. 2 and 5 controls the potentiometer recorder 40 through its leads or conductors 32—115 in a manner similar to the control of the potentiometer recorder 40 by the cell 10 through its leads 16—15 in Fig. 4, as described above. In Fig. 5, however, there is but one constant level box 32B which is supplied with treated water through the pipe 31B and, in turn, supplies the treated water to the pipe or jet 117. The pipe 31B is shown provided with a valve V—5 and a tap containing a valve V—4 through which untreated water (or tap water) may be supplied when the valve V—4 is open and valve V—5 is closed, for the purpose of calibrating the cell and system and for cleaning the cell when desired. In normal operation, the valve V—4 will be closed and the valve V—5 will be open.

The operation of the system shown in Fig. 5 will be understood by those skilled in the art by virtue of the foregoing descriptions.

In the foregoing description, I have referred to the translating device 40 as a conventional recording potentiometer. Such devices are now on the market. This potentiometer may be of the type illustrated in Fig. 122, section 3, page 286, or described in section 3, paragraphs 284 and 285, on pages 282, 283 of the Standard Handbook for Electrical Engineers, sixth edition, published by the McGraw-Hill Company; or it may be of the general type disclosed in United States Patent No. 1,530,833, patented March 24, 1925, on application of E. A. Keeler.

In accordance with the provisions of the patent statutes, I have herein described the principle of operation of my invention, together with the apparatus which I now consider to represent the best embodiments thereof, but I desire to have it understood that the apparatus disclosed is only illustrative and that the invention can be carried out by other means. Also, while it is designed to use the various features and elements in the combinations and relations described, some of these may be altered and others omitted and some of the features of each modification may be embodied in the others without interfering with the more general results outlined, and the invention extends to such use within the scope of the appended claims.

What I claim is:

1. In a system of the class described, in combination, a cell for receiving liquid of which changes of composition are electrically detectable, said cell having liquid discharge means and electrodes at least one of which is a fluid metallic electrode in contact with such liquid received by the cell for detection of changes of composition thereof, said electrodes being in electrical communication through said liquid, and said cell including means for agitating said fluid metallic electrode, and means electrically connected to the electrodes of said cell and responsive to changes in electrical effect across its electrodes, for detecting changes in composition of the liquid.

2. In a system of the class described, in combination, a cell including electrolyte discharge means, a reference half cell and a fluid metallic electrode in contact with an electrolyte whose changes in composition are to be detected, said half cell being in electrical communication with said electrolyte, means for supplying electrolyte to said cell, said electrolyte-supplying means including means for agitating said fluid metallic electrode, and means electrically connected to said half cell and to said electrode and responsive to changes in voltage across said half cell and electrode, for detecting electrically detectable changes in composition of the electrolyte.

3. In a system of the class described, in combination, a cell having a plurality of fluid metallic electrodes, means for subjecting one of said electrodes to untreated liquid, means for subjecting another of said electrodes to treated liquid, said liquids being in electrical communication and being capable of effecting change in voltage between said electrodes upon change in composition of one of said liquids, means for agitating said electrodes, and means connected to said electrodes for detecting changes in voltage across said electrodes.

4. In a system of the class described, in combination, means for treating a liquid by adding a different material thereto which is capable of producing an electrically detectable effect in the liquid, a fluid metallic electrode exposed to the treated liquid, means for agitating said fluid metallic electrode, and means including said electrode for detecting changes in composition of the treated liquid.

5. In a system of the class described, in combination, means for treating a liquid by adding a different material thereto which is capable of producing an electrically detectable effect in the liquid, electrical liquid-testing means comprising a fluid metallic electrode exposed to the first mentioned liquid prior to treatment, and a second fluid metallic electrode exposed to the treated liquid, means for agitating each of said fluid metallic electrodes, and translating means responsive to changes in voltage across said fluid metallic electrodes, for electrically detecting changes in the said electrically detectable effect of treatment, in the treated liquid.

6. In a system of the class described, means for treating a liquid to effect electrically detectable modification thereof, a fluid metallic electrode, means for squirting treated liquid against said electrode, and means including said fluid metallic electrode for electrically detecting changes in composition of the treated liquid.

7. In a system of the class described, in combination, means for treating a liquid to effect electrically detectable modification thereof, a fluid metallic electrode exposed to the treated liquid, means for agitating said fluid metallic electrode, and means including said fluid metallic electrodes, means for subjecting one of the first mentioned means.

8. In a system of the class described, a cell comprising, in combination, an electrode exposed to an electrolyte, a fluid metallic electrode exposed to an electrolyte different from said first mentioned electrolyte but in electrical contact therewith, means for squirting a stream of the second mentioned electrolyte against the second mentioned electrode to agitate the latter, and means connected to said electrode for electrically detecting change in the composition of said second-mentioned electrolyte.

9. In a system of the class described, in combination, a fluid metallic electrode, a second fluid metallic electrode in contact with said first mentioned electrode through an electrolyte, means for treating liquid to effect electrically detectable modification thereof, means for projecting untreated liquid against one of said electrodes, means for projecting treated liquid against the other electrode, and translating means electrically connected across said electrodes for determining electrically-detectable differences in composition between said treated and untreated liquids.

10. The method of treating and controlling the treatment of a flowing stream of water, which method comprises, adding chlorine to the flowing stream, squirting a stream of the treated water against a fluid metallic electrode to agitate the latter, detecting changes in electrical potential of the electrode and converting changes in electrical potential into changes in the supply of chlorine to the flowing stream.

11. The method of treating and controlling the treatment of a flowing stream of water, which method comprises, squirting a stream of the untreated water against a fluid metallic electrode to agitate the latter, adding chlorine to the first mentioned flowing stream of water, squirting a stream of the treated water against a fluid metallic electrode to agitate the latter, detecting changes in difference of potential between said electrodes, and converting said changes in difference of potential into changes in the supply of chlorine to the first-mentioned flowing stream.

12. In a system of the class described, in combination, a cell for receiving liquid containing material of which the content in the liquid is electrically determinable, said cell having liquid discharge means and electrodes at least one of which is a fluid metallic electrode in contact with such liquid received by the cell for determination of the content of said material, said electrodes being in electrical communication through said liquid, and said cell including means for agitating said fluid metallic electrode, and means electrically connected to the electrodes of said cell and responsive to changes in electrical effect across its electrodes, for measuring the content of the aforesaid material in the liquid.

CHARLES F. WALLACE.

CERTIFICATE OF CORRECTION.

Patent No. 2,289,610.                                July 14, 1942.

CHARLES F. WALLACE.

It is hereby certified that error appears in the printed specification of the above numbered patent requiring correction as follows: Page 3, second column, line 68, after "71A," insert --A,--; page 5, second column, line 28, claim 7, for "electrodes, means for subjecting one of" read --electrode for controlling the operation of--; and that the said Letters Patent should be read with this correction therein that the same may conform to the record of the case in the Patent Office.

Signed and sealed this 1st day of September, A. D. 1942.

(Seal)
Henry Van Arsdale,
Acting Commissioner of Patents.